United States Patent [19]

Yoshiharu et al.

[11] Patent Number: 4,828,476
[45] Date of Patent: May 9, 1989

[54] DIRECT-PRESSURE TYPE MOLD CLAMPING MECHANISM OF AN INJECTION-MOLDING MACHINE

[75] Inventors: Inaba Yoshiharu, Kawasaki; Fumio Mitoguchi, Hino; Masao Kamiguchi, Houya; Shigeo Tokunaga, Hino, all of Japan

[73] Assignee: Fanuc Ltd, Yamanashi, Japan

[21] Appl. No.: 180,972

[22] PCT Filed: Jul. 17, 1987

[86] PCT No.: PCT/JP87/00525
§ 371 Date: Apr. 27, 1988
§ 102(e) Date: Apr. 27, 1988

[87] PCT Pub. No.: WO88/00520
PCT Pub. Date: Jan. 28, 1988

[30] Foreign Application Priority Data

Jul. 17, 1986 [JP] Japan .................. 61-166808
Jul. 19, 1986 [JP] Japan .................. 61-169026

[51] Int. Cl.⁴ ............................................. B29C 45/80
[52] U.S. Cl. .................................. 425/150; 425/171; 425/590
[58] Field of Search ............... 425/145, 150, 171, 589, 425/590

[56] References Cited

U.S. PATENT DOCUMENTS 4,540,359 9/1985 Yamazaki ........................... 425/542
4,615,669 10/1986 Fujita et al. ........................ 425/589

FOREIGN PATENT DOCUMENTS 43-1511 1/1968 Japan .
47-19344 6/1972 Japan .
51-13495 4/1976 Japan .
60-49853 3/1985 Japan .

Primary Examiner—Jay H. Woo
Assistant Examiner—Timothy W. Heitbrink
Attorney, Agent, or Firm—Staas & Halsey

[57] ABSTRACT

A direct-pressure type mold clamping apparatus of an injection-molding machine, capable of performing high-speed mold closing and opening operations and of producing a required mold clamping force, without the use of a large-sized motor, is driven by two motors. The mold clamping apparatus includes a ball screw (6) engaging a ball nut (7) which is movable in unison with a movable platen (1). The ball screw is coupled to a servomotor (10) through a transmission mechanism (8, 9, 11, 17), and is also coupled to an induction motor (12) through the transmission mechanism, a speed reducer (14), and a clutch (15). A numerical control unit (20) controls the servomotor, the induction motor, and the clutch. After the movable platen, drive by the servomotor, is moved at high speed to a die touch position, the movable platen is driven to a set mold clamping force producing position with a greater driving force, by both the servomotor and the induction motor. When the movable platen reaches the set clamping force producing position, the induction motor is braked by means of a braking system (13), so that the movable platen is locked to the foresaid position, thereupon the required mold clamping force is produced.

11 Claims, 3 Drawing Sheets

DIRECT-PRESSURE TYPE MOLD CLAMPING MECHANISM OF AN INJECTION-MOLDING MACHINE

BACKGROUND OF THE INVENTION

1. Field of the Invention

The present invention relates to a motor-operated direct-pressure type mold clamping apparatus of an injection-molding machine, which is capable of effecting mold-closing and mold-opening and of producing a required mold clamping force.

2. Description of the Related Art

An injection-molding machine is furnished with a toggle type mold clamping mechanism, in which a drive source and a movable platen are connected by means of a toggle link, or a direct-pressure type mold clamping mechanism, in which the drive source and the movable platen are connected directly. The clamping mechanism serves to open or close and clamp dies that are attached individually to the movable platen and a stationary platen.

In the mold clamping operation, the dies must be clamped with a great force. Thus, a requisite for the drive source of a mold clamping mechanism is the capability of producing a great clamping force. In the process of injection molding, moreover, the time required for the manufacture of each molding, i.e., the cycle time, is expected to be shortened. Another requisite for the drive source, therefore, is to be able to drive the dies at high speed while they are being opened or closed.

The toggle link acts so as to help the dies be opened or closed at high speed, and to facilitate the production of a great clamping force. Thus, the toggle type mold clamping mechanism fulfills both of the aforesaid requirements. The direct-pressure type mold clamping mechanism, on the other hand, has the advantage over the toggle type mold clamping mechanism that it does not require mold thickness adjustment for compensating the change of the die thickness. It is difficult for the direct-pressure type mold clamping mechanism, however, to satisfy both the aforementioned requirements. In the case of a direct-pressure type mold clamping mechanism using a motor as its drive source, for example, both those requirements can be fulfilled only if the motor used has a very large capacity, and therefore, is an expensive one. In consequence, the manufacturing cost of the injection-molding machine increases inevitably.

SUMMARY OF THE INVENTION

Accordingly, an object of the present invention is to provide a motor-operated, direct-pressure type mold clamping mechanism, capable of accurate, high-speed mold closing and opening operations and of producing a required mold clamping force, without the use of a special large-capacity motor.

In order to achieve the above object, a mold clamping apparatus of an injection-molding machine according to the present invention comprises conversion means which includes a rotating member and a rectilinear motion member movable in unison with a movable platen, the conversion means serving to convert a rotary motion of the rotating member into a rectilinear motion of the rectilinear motion member. The mold clamping apparatus further comprises transmission means for transmitting the rotation of a servomotor to the rotating member, and and a speed reducer for reducing the rotating speed and increasing the rotary force of an induction motor, and transmitting the increased rotary force to the transmission means. The speed reducer and the transmission means are releasably coupled by means of clutch means.

According to a first aspect, the mold clamping apparatus preferably comprises a numerical control unit connected to detecting means for detecting the moved position of the movable platen. The numerical control unit actuates the clutch means, thereby causing both the servomotor and the induction motor to drive the movable platen from a first predetermined position, in which dies fitted individually on the movable platen and the fixed platen touch each other, to a second position, in which a set mold clamping force is produced, when the movable platen, driven by means of the servomotor, reaches the first predetermined position. When the second predetermined position is reached, moreover, the numerical control unit actuates the braking means, thereby locking the movable platen.

According to a second aspect, the mold clamping apparatus preferably comprises position detecting means coupled to the servomotor and serving to detect the moved position of the movable platen, and a servo-circuit for driving the servomotor, the servo-circuit including an error register which receives an output signal from the detecting means and a command signal from the numerical control unit. The numerical control de-energizes the servomotor and actuates the clutch means, thereby causing the induction motor to drive the movable platen from the first predetermined position to the second position, when the movable platen, driven by means of the servomotor, reaches the first predetermined position. When the second predetermined position is reached, the numerical control unit actuates the braking means, thereby locking the movable platen, and reduces an error value in the error register to zero, the error value being produced as the servomotor rotates, accompanying the rotation of the induction motor corresponding to the movement of the movable platen from the first predetermined position to the second predetermined position.

Thus, according to the present invention, the output torque of the induction motor increased by means of the speed reducer or the resulting torque of the induction motor and the servomotor is converted into a driving force for driving the movable platen by means of the transmission means and the conversion means, in a mold clamping mode. THe movable platen is moved by means of the driving force, thereby producing a great mold clamping force, in a mold closing or opening mode, on the other hand, the transmission means and the induction motor are disconnected from each other, and the movable motor is moved by means of the servomotor only. Thus, a great mold clamping force can be produced in the mold clamping mode, while the movable platen can be moved accurately and at high speed in the mold closing or opening mode. Also, there is no need of a large-capacity motor. Moreover, the highly controllable servomotor for mold opening and closing operations is combined with the induction motor for producing mold clamping force, which can easily provide a high output and is relatively low-priced. Therefore, an injection-molding machine can be obtained which is economical and high in control accuracy, and has a short cycle time. Furthermore, a drive source for the movable platen need not be a servomotor with a specially great output torque. In limiting the torque of the servomotor for die protection during the mold closing operation, therefore, an optimum torque limit operation can be achieved even through the resolution of torque limit value setting is low.

DETAILED DESCRIPTION OF THE PREFERRED EMBODIMENTS

Figure 1:
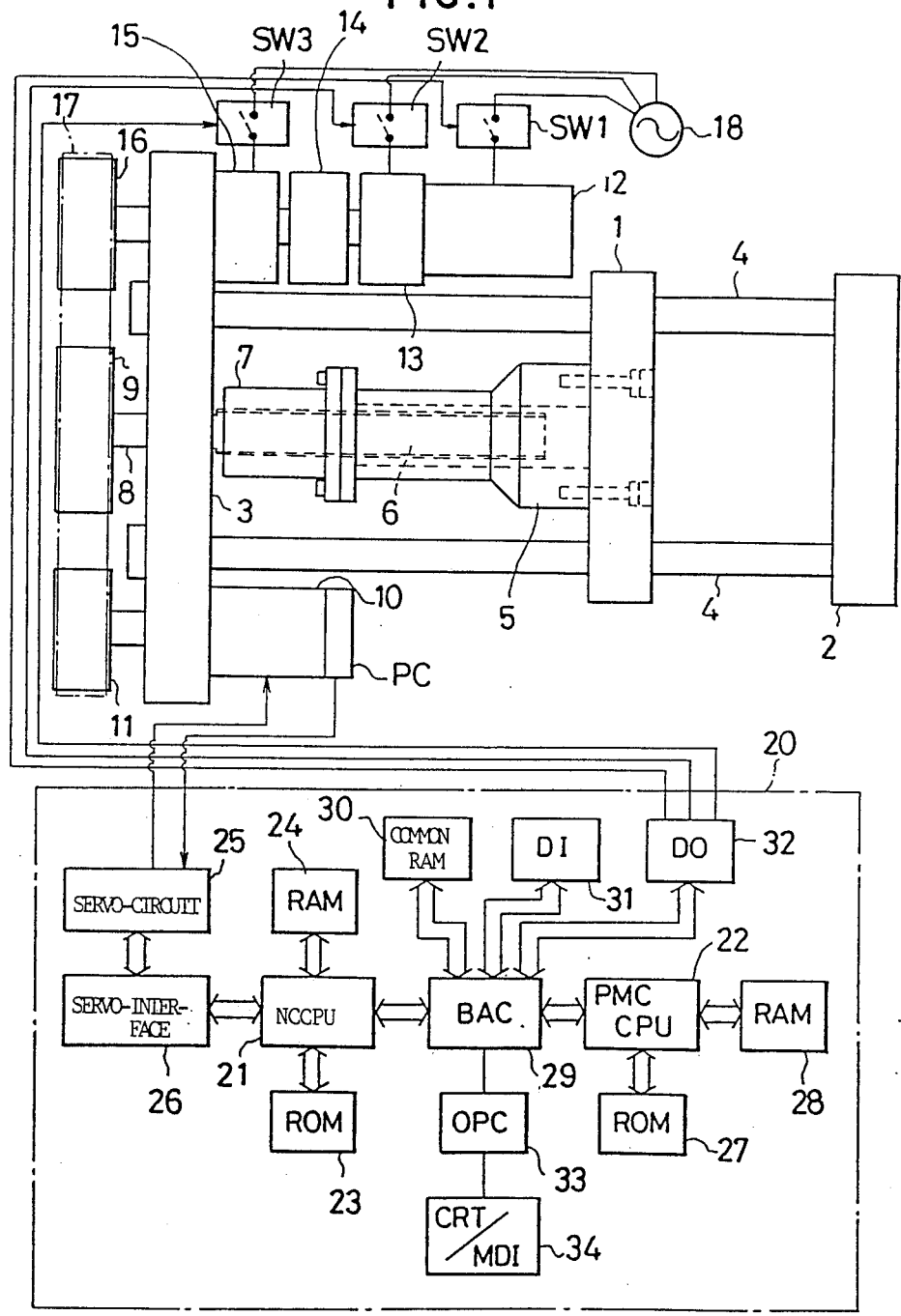
FIG. 1 is a schematic view showing a mold clamping apparatus according to a first embodiment of the present invention.

FIG. 1 shows a direct-pressure type mold clamping mechanism according to a first embodiment of the present invention. In FIG. 1, numerals 1, 2 and 3 denote a movable platen, a stationary platen, and a rear platen, respectively. The stationary platen 2 and the rear platen 3 are fixed to a base (not shown) of an injection-molding machine. The movable platen 1 is supported, by means of four tie bars (two of which are denoted by numeral 4) supported at either end by the platens 2 and 3, so as to be movable from side to side, as illustrated, along the tie bars 4. The movable platen 1 and the stationary platen 2 are fitted individually with dies (not shown). A hollow cylindrical nut mounting member 5, extending parallel to the tie bars 4, is fixed to the central portion of the rear-platen-side end face of the movable platen 1. A ball nut 7 is fixed to the distal end of the mounting member 5 so as to be coaxial with the member 5. The mounting member 5 is formed with a through hole extending along the axis thereof. This through hole communicates with a tapped hole of the ball nut 7, and contains a ball screw 6, in engagement with the nut 7, for axial movement. A shaft 8 integral with the ball screw 6 extends outward through the rear platen 3, and is supported by the platen 3 with the aid of a thrust bearing and a radial bearing, not shown. A timing gear 9 is fixed to the outer end of the ball screw shaft 8. A servomotor 10 with an absolute position detector PC is fixed to the rear platen 3, and a timing gear 11 is fixed to the output shaft of the servomotor 10 which extends outward through the rear platen 3.

As induction motor 12 with a braking system 13 is fixed to the base of the injection-molding machine. The output shaft of the motor 12 is coupled to the input shaft of a speed reducer 14, whose output shaft is coupled to the input shaft of a clutch 15. The output shaft of the clutch 15 is supported by the rear platen 3, and extends outward through the platen. A timing gear 16 is fixed to the distal end of the output shaft of the clutch 15. A timing belt 17 is passed between and around the timing gears 9, 11 and 16. Symbols SW1 to SW3 designate switches, which are turned on and off in response to commands from a numerical control unit (hereinafter referred to as NC unit) 20 (mentioned later), thereby connecting and disconnecting power supply from a power source 18 to the induction motor 12, the braking system 13, and the clutch 15.

The NC unit 20 includes a microprocessor (hereinafter referred to a NCCPU) 21 for numerical control and a microprocessor (hereinafter referred to as PMCCPU) 22 for programmable machine controller. The NCCPU 21 is connected with a ROM 23, which stores a control program for generally controlling the injection-molding machine, and a RAM 24 for tentatively storing various results of arithmetic operations. The NCCPU 21 is also connected, through a servo-interface 26, with servomotors (not shown) for various axes for injection, screw rotation, ejector operation, etc., and a servo-circuit for controlling the drive of the servomotor 10 of the aforementioned mold clamping mechanism (among which only the servo-circuit for the servomotor 10 is denoted by numeral 25). On the other hand, the PMCCPU 22 is connected with a ROM 27, which stores a sequence control program or the like for the injection-molding machine or the like, and a RAM 28 for tentatively storing the results of arithmetic operations or the like. Moreover, a bus-arbiter controller (hereinafter referred to as BAC) 29, which is interposed between the two CPUs 21 and 22, is connected with a nonvolatile common RAM 30 storing operation control programs for the injection-molding machine and other programs, an input circuit 31, an output circuit 32, and an operator panel controller (hereinafter referred to as OPC) 33. The OPC 33 is connected with a manual input control panel with a CRT display (hereinafter referred to as MDI/CRT) 34. The switches SW1 to SW3 are connected to the output circuit 32.

Figure 2:
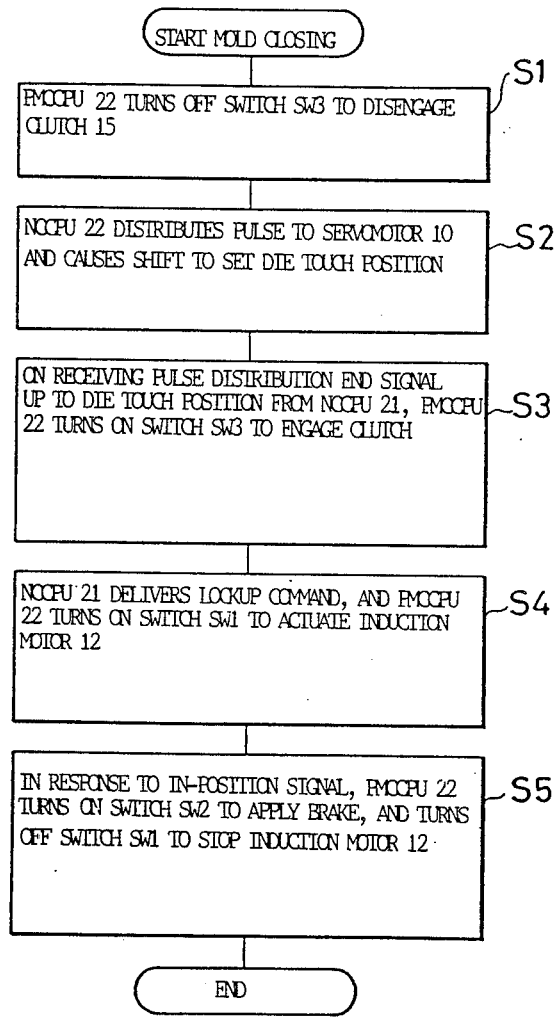
FIG. 2 is a flow chart for illustrating the mold closing and clamping operations of the apparatus shown in FIG. 1.

Referring now to FIG. 2, the operation of the mold clamping apparatus with the aforementioned construction will be described. First, mold clamping control parameters, such as mold opening end position, die protection start position, mold touch position, mold clamping force position, mold opening acceleration position, mold opening deceleration position, and die moving speed, are previously set by means of the CRT/MDI 34 using, e.g., macro-variables. At the start of mold closing, the PMCCPU 22 causes the output circuit 32 to turn off the switch SW3, thereby disengaging the clutch 15 (Step S1). On the other hand, the NCCPU 21 performs pulse distribution in accordance with an NC program, to drive the servomotor 10 in a mold closing direction through the medium of the servo-interface 26 and the servo-circuit 25. As the motor rotates, the ball screw 6 rotates, driven by the timing gear 11, the timing belt 17, and the timing gear 9. The movable platen is advanced by means of the ball nut, in engagement with the ball screw 6, and the nut mounting member 5 movable in one with the nut (Step S2). In the meantime, the timing gear 16 on the side of the induction motor 12 keeps on racing. When the movable platen 1 reaches the die protection start position, the rotating speed of the servomotor 10 is reduced to a die protection speed, and the movable platen 1 is further advanced. Thereafter, when pulse distribution up to the set die touch position is completed with the movement of the movable platen 1, the NCCPU 21 writes a pulse distribution end signal in the common RAM 30.

When the PMCCPU 22 reads this pulse distribution end signal from the common RAM 30, it causes the output circuit 32 to turn on the switch SW3, thereby engaging the clutch 15 (Step S3). Then, the NCCPU 21 starts pulse distribution up to a set mold clamping force producing position, i.e., a lockup position, and to the servo-circuit 25. Meanwhile, the PMCCPU 22 causes the output circuit 32 to turn on the switch SW1, thereby driving the induction motor 18 in the mold closing direction (Step S4). The output of the induction motor 18 is reduced in rotating speed and enhanced in torque by the speed reducer 14, and is then transmitted through the clutch 11 to the timing gear 16, thereby driving this gear. Accordingly, the timing gear 9 fixed to the shaft 8 of the ball screw 6 is driven in the mold closing direction by both the timing gear 16 driven by means of the induction motor 12 and the timing gear 11 driven by means of the servomotor 10, through the medium of the timing belt 11. Thus, the ball screw 6 is rotated in the mold closing direction with a great resultant torque. As a result, the movable platen 1, which is movable in unison with the ball nut 7 in engagement with the ball screw 6, is subjected to a great driving force in the mold closing direction, thus clamping the dies while causing the tie bar 4 to extend.

When an in-position signal is applied from the servo-circuit 25 through the servo-interface 26 to the NCCPU 21 immediately before the completion of lockup operation, the NCCPU 21 writes a lockup end signal in the common RAM 30. Immediately after this, the pulse distribution up to the lockup position is completed. When the PMCCPU 22 reads this lockup end signal, it causes the output circuit 32 to turn on the switch SW2, thereby working the braking system 13 to prevent the induction motor 12 from rotating. As a result, the movable platen 1 is held in the lockup position (set mold clamping force producing position) by the agency of the speed reducer 14, clutch 15, timing gear 16, timing belt 17, timing gear 9, ball screw 6, and ball nut 7. At the same time, the PMCCPU 22 causes the output circuit 32 to turn on the switch SW1, thereby stopping the drive of the induction motor 12 (Step S5). Thus, the mold closing and clamping operations are finished.

Thereafter, molten molding resin is injected into the dies and cooled, whereupon mold opening is performed. At the start of the mold opening, the PMCCPU 22 causes the output circuit 32 to turn off the switches SW2 and SW3, thereby removing the braking action of the braking system 13 and disengaging the clutch 15. Meanwhile, the NCCPU 21 drives the servomotor 10 in accordance with the NC program, through the medium of the servo-interface 26 and the servo-circuit 25, thereby causing the movable platen 1 to retreat at a mold release speed. Thereafter, the mold opening end position is reached after acceleration and deceleration, and the drive of the servomotor 10 is stopped.

In the mold closing and opening modes, as described above, the movable platen 1 is driven by means of the servomotor 10 whose position and speed are controlled by the NC unit 20. Accordingly, the mold closing and opening operations can be performed accurately and at high speed. In the mold clamping mode, on the other hand, the movable platen 1 is driven with the great driving force by both the output of the servomotor 10 and the output fo the induction motor 12 which is enhanced by means of the speed reducer 14, so that a great mold clamping force can be obtained.

Thus, the function to produce the mold clamping force and the function to execute the mold closing and opening operations are allotted to the induction motor and the servomotor, respectively, so that an economical mold clamping apparatus can be obtained without requiring the use of any large-capacity motors for these individual motors.

Moreover, the servomotor for the mold opening and closing operations requires an output torque of only about 2 to 3 tons. Thus, if the resolution of torque limit value setting is 1/100, the output torque of the servomotor can be controlled in blocks of about 20 to 30 kg, so that die protection can be achieved most suitably. When performing the mold opening and closing operations and the mold clamping operation by means of one motor, on the other hand, the motor used must produce the maximum output torque of about 100 tons. Thus, the motor output torque cannot be reduced to about 1 ton or less, and the die protection is difficult.

A mold clamping apparatus according to a second embodiment of the present invention will now be described.

The apparatus of this embodiment differs from the first embodiment, in which the movable platen 1 is driven by means of both the servomotor 10 and the induction motor 12 in the mold clamping mode, in that the mold clamping is performed by means of the output of the motor 12 only. The apparatus according to this embodiment, like the one according to the first embodiment, is constructed as shown in FIG. 1, so that description of its construction is omitted herein.

The operation of the mold clamping apparatus of the second embodiment will now be described.

Figure 3:
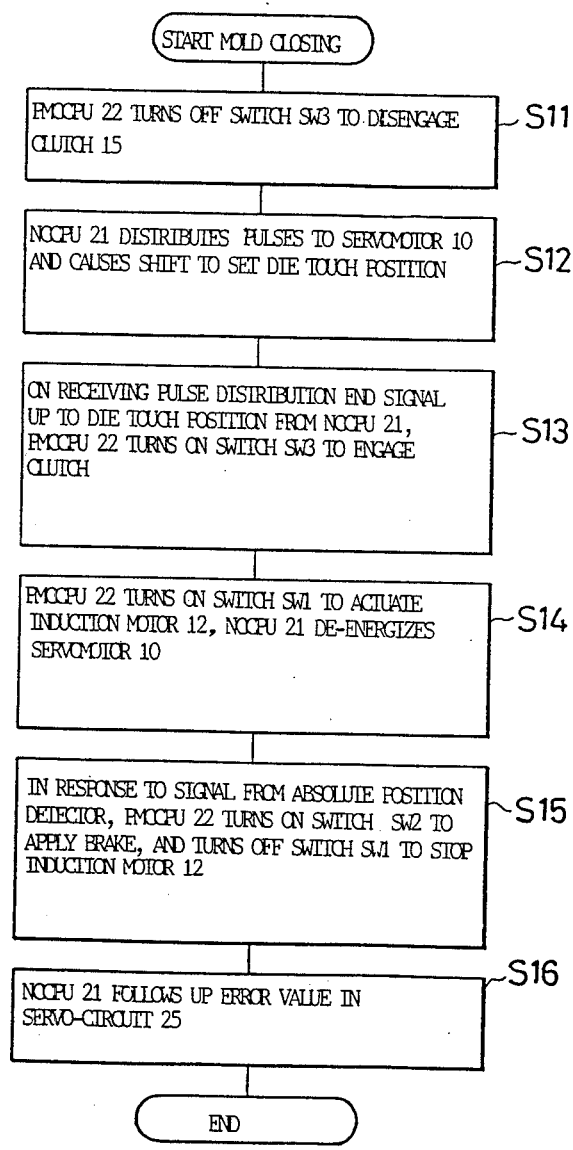
FIG. 3 is a flow chart for illustrating the mold closing and clamping operations of a mold clamping apparatus according to a second embodiment of the present invention.

First, Steps S11 to S13, which correspond individually to Steps S1 to S3 in FIG. 3, are executed. More specifically, the movable platen 1 is driven toward the die touch position, and when the pulse distribution up to the dire touch position is completed, the clutch 15 is engaged.

Then, the PMCCPU 22 causes the output circuit 32 to turn on the switch SW1, thereby actuating the induction motor 12. Thereupon, the movable platen 1 is advanced by means of the speed reducer 14, clutch 15, timing gear 16, timing belt 17, timing gear 9, ball screw 6, and ball nut 7. Meanwhile the NCCPU 21 deenergize the servomotor 10 through the medium of the servo-interface 26 and the servo-circuit 25 (Step S14).

As a result, the movable platen 1 is driven by means of the output of the induction motor 12 only. In other words, the mold clamping is performed by means of the output torque of the induction motor 12 which is enhanced by the speed reducer 14. In the meanwhile, the output shaft of the de-energized servomotor 10 is rotated by means of the timing belt 17 and the timing gear 11 as the motor 12 rotates. Even during this period, therefore, the absolute position detector PC attached to the servomotor 10 delivers a signal indicative of the current position of the movable platen 1. In executing a task one grade higher than a program for the mold clamping control, the NCCPU 21 periodically reads the signal from the absolute position detector PC and writes it in the common RAM 30. When the PMCCPU 22 detects the arrival at the lockup position or the set clamping force producing position through the common RAM 30, the NCCPU 21 causes the output circuit 32 to turn on the switch SW1, thereby working the braking system 13, and to turn on the switch SW1, thereby stopping the drive of the induction motor 12 (Step S15). As a result, the movable platen 1 is held in the lockup position, and a set clamping force is applied to the dies. Then, the NCCPU 21 reads an error value in an error register in the servo-motor 25 in order that the error value, which is accumulated in the register as the servomotor 10 is caused to idle by the rotation of the motor 12, is reduced to zero. Thereafter, the NCCPU 21 performs pulse distribution such that the read value is subtracted from the value stored in the register, thereby effecting the so-called follow-up (Step S16). Thus, the mold clamping operation is finished.

The mold opening operation is formed in the same manner as in the case of the first embodiment, and its description is omitted herein.

We claim:

1. A direct-pressure mold clamping apparatus of an injection-molding machine having a fixed platen and a movable platen, each platen having a die connected thereto, the apparatus comprising:

conversion means including a rotatable member and a rectilinear motion member movable in unison with said movable platen, for converting rotary motion of said rotatable member into rectilinear motion of said rectilinear motion member;

a servomotor operatively connected to said rotatable member and having a rotational output;

an induction motor connected to said rotatable member and having a rotary speed and rotary force providing a rotational output;

transmission means for transmitting the rotational output of said servomotor to said rotatable member;

a speed reducer connected to said induction motor for reducing the rotary speed and increasing the rotary force of said induction motor, and transmitting the increased rotary force to said transmission means;

clutch means, interposed between said speed reducer and said transmission means, for releasably coupling said speed reducer and said transmission means; and braking means coupled to said induction motor for braking said induction motor.

2. A direct-pressure type mold clamping apparatus according to claim 1, which further comprises detecting means for detecting the position of said movable platen, and a numerical control unit connected to said detecting means for controlling said servomotor, induction motor, clutch means, and braking means, said numerical control unit actuating said clutch means, thereby causing both said servomotor and said induction motor to drive said movable platen from a first predetermined position, in which said dies touch each other, to a second position, in which a set mold clamping force is produced, when said movable platen, driven by said servomotor, reaches said first predetermined position, and actuating said braking means, thereby locking said movable platen, when said second predetermined position is reached.

3. A direct-pressure type mold clamping apparatus according to claim 1, which further comprises detecting means coupled to said servomotor for detecting the position of said movable platen, a numerical control unit connected to said detecting means for controlling said servomotor, said induction motor, said clutch means, and said braking means, and a servo-circuit for driving said servomotor and including an error register receiving an output signal from said detecting means and a command signal from said numerical control unit, said numerical control unit de-energizing said servomotor and actuating said clutch means, thereby causing said induction motor to drive said movable platen from a first predetermined position, in which said dies touch each other, to a second position, in which a set mold clamping force is produced, when said movable platen, driven by said servomotor, reaches said first predetermined position, and actuating said braking means, thereby locking said movable platen, and reducing an error value in said error register to zero when said second predetermined position is then reached, said error value being produced as said servomotor rotates, accompanying the rotational output of said induction motor corresponding to movement of said movable platen from said first predetermined position to said second predetermined position.

4. A direct-pressure type mold clamping apparatus according to claim 2 wherein said numerical control unit, after mold clamping, drives said servomotor, thereby moving said movable platen from said second predetermined position to a third predetermined position in which mold opening ends.

5. A direct-pressure type mold clamping apparatus according to claim 1, wherein said conversion means includes a ball nut, for use as said rectilinear motion member, and a ball screw as said rotating member mating with said ball nut.

6. A direct-pressure type mold clamping apparatus according to claim 1, wherein said servomotor has an output shaft, and said transmission means includes timing gears fixed individually to the output shaft of said speed reducer, the output shaft of said servomotor, and said rotating member, and a timing belt passed between and around said timing gears.

7. A direct-pressure type mold clamping apparatus according to claim 3, wherein said numerical control unit, after mold clamping, drives said servomotor, thereby moving said movable platen from said second predetermined position to a third predetermined position in which mold opening ends.

8. A direct-pressure type mold clamping apparatus according to claim 2, wherein said conversion means includes a ball nut, for use as said rectilinear motion member, and a ball screw as said rotating member mating with said ball nut.

9. A direct-pressure type mold clamping apparatus according to claim 3, wherein said conversion means includes a ball nut, for use as said rectilinear motion member, and a ball screw as said rotating member mating with said ball nut.

10. A direct-pressure type mold clamping apparatus according to claim 2, wherein said servomotor has an output shaft, and said transmission means includes timing gears fixed individually to the output shaft of said speed reducer, the output shaft of said servomotor, and said rotating member, and a timing belt passed between and around said timing gears.

11. A direct-pressure type mold clamping apparatus according to claim 3, wherein said servomotor has an output shaft, and said transmission means includes timing gears fixed individually to the output shaft of said speed reducer, the output shaft of said servomotor, and said rotating member, and a timing belt passed between and around said timing gears.

* * * * *

UNITED STATES PATENT AND TRADEMARK OFFICE
CERTIFICATE OF CORRECTION

PATENT NO. : 4,828,476

DATED : May 9, 1989

INVENTOR(S) : Inaba Yoshiharu et al.

It is certified that error appears in the above-identified patent and that said Letters Patent is hereby corrected as shown below:

Front Page [73] Assignee "Yamanashi" s/b --Minamitsuru--;

[57] Abstract, line 14, "drive" s/b --driven--;

line 22, "foresaid" s/b --aforesaid--.

Col. 2, line 50, "THe" s/b --The--.

Col. 5, line 55, "fo" s/b --of--.

Col. 6, line 27, "dire" s/b --die--;

line 55, "SW1" s/b --SW2--;

line 61, "servo-motor" s/b --servomotor--.

Col. 8, line 14, "2" s/b --2,--.

Signed and Sealed this

Twelfth Day of December, 1989

*Attest:*

JEFFREY M. SAMUELS

*Attesting Officer*      *Acting Commissioner of Patents and Trademarks*